Figure 1:
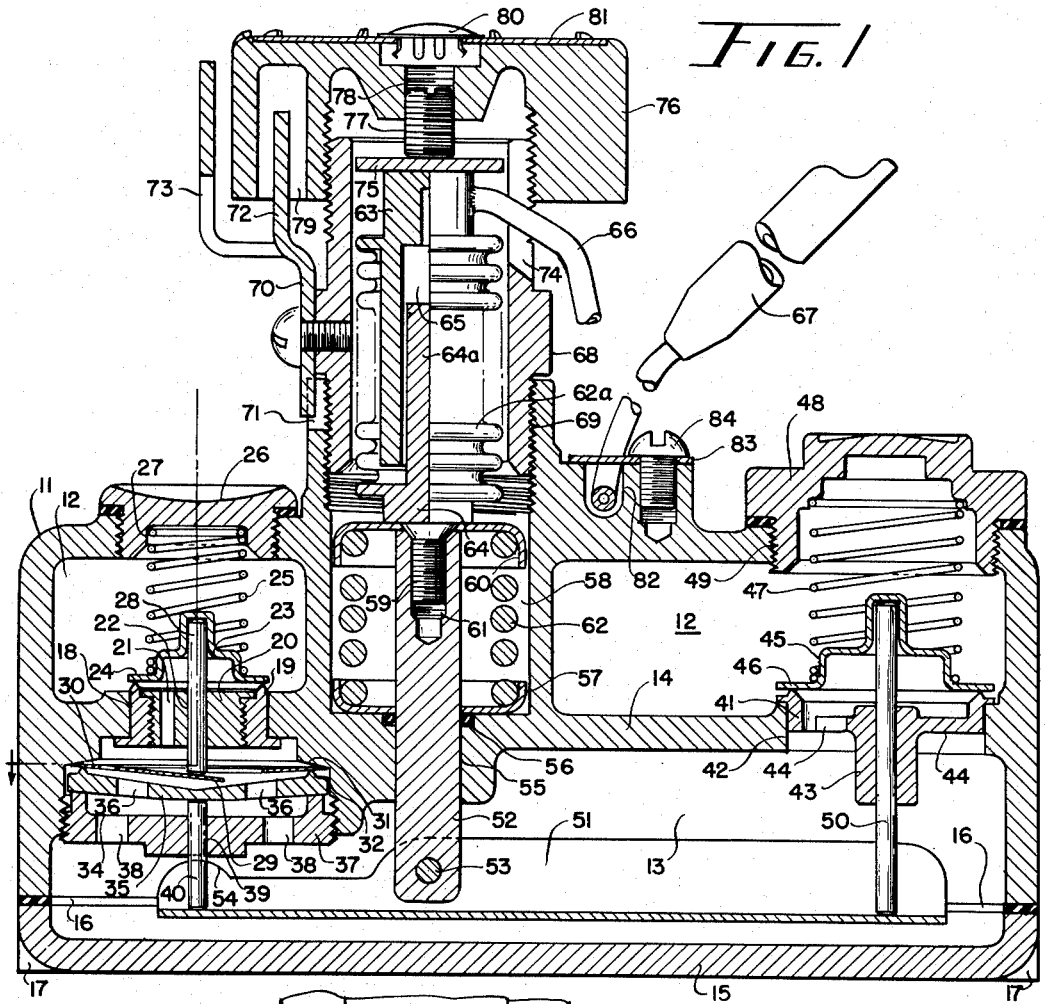

Nov. 22, 1955  C. D. COFFEY  2,724,409

THERMOSTATIC VALVE

Filed Dec. 29, 1951

INVENTOR.
CHARLES D. COFFEY
BY
George H. Fisher
ATTORNEY

United States Patent Office 2,724,409
Patented Nov. 22, 1955

2,724,409

THERMOSTATIC VALVE

Charles D. Coffey, Inglewood, Calif., assignor to Minneapolis-Honeywell Regulator Company, Minneapolis, Minn., a corporation of Delaware Application December 29, 1951, Serial No. 264,153

8 Claims. (Cl. 137—628)

This invention relates to combined snap-acting and modulating valves for regulating fluid flow. More particularly, the invention relates to such a valve for use in controlling the flow of gas to a unit heater in response to temperature changes in a space, the temperature of which is to be controlled.

In the use of space heaters, it is customary to provide a thermostatic control for regulating the flow of gas to said heater to maintain a desired space temperature. The type of control that has heretofore been used to any great extent has been a simple "on-off" valve that is snapped between the "on" and "off" positions by means of a temperature responsive power means. While it has always been desired to have the gas flow to the heater regulated in accordance with heat demand, between the "on" and a minimum-flow position, no satisfactory, inexpensive and reliable valve has been designed and produced.

It is an object of this invention to provide a gas valve for a heating unit which will snap between a closed and a minimum flow position for reliable lighting, and thereafter modulate between the minimum flow position and the full open position in response to heat demand.

Another object of the invention is to provide a combination snap-acting and modulating valve in a unitary valve structure, wherein a temperature responsive means will first actuate the snap-acting valve to its open position to provide minimum gas flow for igniting purposes and thereafter open a second larger valve gradually between its closed position and a position which will provide the gas flow necessary for maintaining a desired space temperature.

Still another object of the invention is to provide an inexpensive yet reliable valve, having a rugged and easily operated snap-acting mechanism, that is adapted to be actuated by the same control means that operates a stronger and larger valve.

Another object of the invention is to provide a combined snap-acting and modulating valve wherein an adjustable rigid abutment is provided to limit the movement of a temperature responsive power means after its movement of the snap-acting mechanism to its valve open position and to transmit, thereafter, all additional forces of the temperature responsive means to the modulating valve for operation thereof.

Still another object of the invention is to provide a rugged snap-acting disc having a motion-magnifying, valve-actuating tongue thereon and an aperture near the base thereof for rendering said snap disc operable by weak forces acting thereon.

Figure 2:
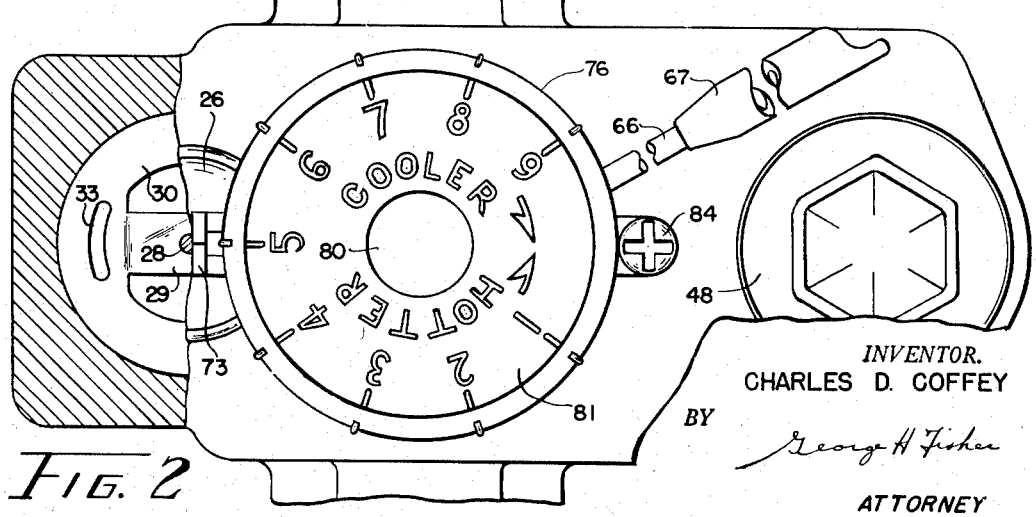

Still further objects of the invention will become apparent upon reading the following detailed description of the invention in conjunction with the accompanying drawing wherein:

Figure 1 is a vertical cross-sectional view of the combined valve along the transverse axis thereof; and Figure 2 is a plan view of the valve with portions thereof broken away.

As can be best seen from Figure 1 of the drawing, the reference numeral 11 designates the main body portion, which has an inlet chamber 12, an outlet chamber 13, and a dividing wall 14 therebetween. A cap member 15 is clamped to the open side of the chamber 13, with a sealing gasket 16 therebetween, by means of screws (not shown) passing through spaced pads 17 positioned around the peripheral edges of the cap member 15.

Positioned in an opening 18, through the partition or dividing wall 14, is a valve seat member 19. Member 19 is secured in said opening 18 in any suitable manner well known in the art, such as by pressing the seat therein. Screw threaded into the valve seat member 19 is a guide plug 20 having a gas flow limiting passage 21 therein parallel to and spaced from a guide passage 22 extending coaxially through said plug. A generally cup-shaped valve 23, having a laterally extending flange 24 thereon for engagement with valve seat member 19, is biased against said valve seat by means of a compression spring 25. A plug 26, having a spring centering bore 27 in the inner end thereof, is screw threaded into an opening in the upper surface of the valve body 11, in axial alignment with the valve 23.

Extending through the guide bore 22 in the plug 20, is a valve actuating pin or stem 28 which engages the valve 23 on the opposite side thereof from the spring 25. The lower end of the pin 28 bears against the free end of a tongue 29 of a washer-shaped snap-disc 30, resting at its outer peripheral edge against the outer peripheral edge of a beveled shoulder 31 formed at the inner end of a threaded bore 32 extending upwardly from the lower surface of the partition wall 14. The snap-disc has an arcuate slot 33 therein which is positioned in alignment with the axis of the tongue 29 so as to reduce the amount of force necessary to cause snapping of the disc 30, to position the tongue 29 on opposite sides thereof. Engaging the snap-disc along a circular line spaced inwardly from the outer edge of the disc, on the under side thereof, is a knife-edged annular rib 34 on the upper surface of a rigid disc 35 having gas flow passages 36 therein. The disc 35 is freely slidable in the upper portion of the bore 32 and is retained therein by means of a stop plug 37 screw threaded in the lower portion of the bore 32. The plug 37 has a plurality of gas flow passages 38 therein and a guide bore 39 therein that is in axial alignment with the pin 28. A plunger 40 extends through the bore 39 into engagement with the under surface of the disc 35 for actuation thereof by means presently to be described.

At the other end of the valve body 11, a second valve seat member 41 is secured in an aperture 42 through the partition or separating wall 14. The valve unit 41 is secured in the opening 42 in a manner similar to that of valve unit 19. The unit 41 has a valve stem guide portion 43 supported centrally thereof by means of spoke-like connecting arms 44. Cooperating with the upper or seat portion of the unit 41, is a generally cup-shaped valve 45 having an outwardly extending flange 46 which is biased against the valve seat member by means of a coil spring 47. The upper end of the coil compression spring butts and is centered in a hollow closure plug 48 that is screw threaded into a threaded opening 49 in the upper surface of the valve body 11 in axial alignment with the valve 45. Extending through the guide portion 43 of the valve seat 41, is an actuating stem for the valve 45 that bears against said valve 45 at its upper end and at its lower end against a power actuator for the two valves, now to be described.

A generally channel-shaped lever 51 is pivotally connected to a plunger 52 by means of a pivot 53. One end of this lever 51 bears against the lower end of the valve plunger 50. The other end of the lever 51 bears against the lower end of the plunger 40. This last mentioned end has the upper edge portions of the two sidewalls thereof upwardly arced at 54 for engagement with the under surface of the stop plug 37. The spacing between these upwardly arced portions 54 and the lower surface of the plug 37 is such that upward movement of the lever 51 will first cause the plunger 40 and rigid disc 35 to snap the snap-disc 30 and valve 23 to their valve open positions before the surfaces 54 engage the under surface of plug 37 to prevent any further upward movement of the plunger 40 and disc 35. It will thus be seen that once the snap-disc has been operated to open the valve 23, no further movement of the rigid disc 35 will take place to possibly cause injury to the snap-disc 30. Likewise, the stopping of the inward movement of the lever portion 54 immediately after the valve has snapped to its open position, will provide an accurate termination of this movement that would not be provided if the upward movement of the portion 54 were determined solely by the back pressure of the snap-disc 30, for purposes to be more clearly understood hereinafter.

The plunger 52 extends upwardly through a guide bore 55 through partition wall 14, a packing O ring 56 and a spring centering cup 57 and into an open-top chamber 58 in the upper portion of the valve body 11. A screw 59 holds a second spring-centering cup 60 on the upper end of the plunger 52 by being screw threaded into an axial bore 61 in the plunger. A coil compression spring 62, strong enough to overpower both the spring 25 and the spring 47 to cause opening of valves 24 and 45 to their open positions, is positioned between cup members 57 and 60 to normally bias the plunger 52 upwardly in valve opening direction.

A thermostatic unit for actuating the plunger 52 in response to temperature changes may take many forms but is illustrated as consisting of a bellows 62a sealingly secured at its upper end to the base of a cup-shaped plug 63. The open end of the plug 63 extends downwardly into the bellows almost to the other end thereof in slightly spaced relationship with respect to the inner convolutions of the bellows. The lower end of the bellows is sealingly connected to a plug 64 having a reduced diameter portion 64a that extends a considerable distance upwardly into the cup-shaped plug 63 with a loose fit to permit the free flow of a suitable expansible fluid, such as "zylene," therebetween. A capillary tube 66 is connected to the upper end of the plug 63 so as to provide communication between the interior of the plug 63 and the bellows 62a and a temperature sensing bulb 67 located at a distant end of the capillary tube 66.

The bellows 62a is held in operating position, with the lower surface of the plug 64 abutting the upper surface of the spring-centering cup 60 and screw 59, by means of an externally threaded sleeve 68 being screw threaded in the upper threaded portion 69 of the chamber 58. The sleeve 68 is keyed to the valve body 11 by means of a pointer and stop member 70 being screwed to the sleeve 68 with the lower end of the member 70 positioned in a slot 71 in the upper wall portion of the chamber 58. The member 70 has an upwardly extending stop arm 72 and a laterally spaced and upwardly extending pointing arm 73. A longitudinal slot 74 in the sleeve 68 provides for the passage of a capillary tube 66 through the wall of sleeve 68 and for vertical adjustment of the upper end of the bellows 62a.

Means for adjusting the upper end of the bellows consists of a bearing disc 75 resting on the upper surface of plug 63, a manually adjustable control knob 76 screw threaded on the upper end of the sleeve 68 for a vertical adjustment thereon, and a calibrating screw 77 screw threaded into a threaded bore 78 in the knob 76. The knob 76 has an arcuate slot 79 therein which is adapted to engage at each end thereof with the stop arm 72, to limit the up and down adjusting movement of the knob 76 on the sleeve 68 and, thus, limit the adjusting of the upper end of the bellows to provide a control range for the valve. A clip type disc 80, extending through an opening in an indicia plate 81 on the top of the knob 76, conceals the adjusting screw 77, but provides ready access thereto for calibration purposes. By holding the knob 76 in a predetermined controlled position, a screw driver may be used to rotate the calibrating screw 77 to adjust the outer end of the bellows to the required position to cause valve actuation by the fluid at the temperature called for by the indicia on the knob.

In order to prevent flexing of the capillary tube 66 at the bellows and where it passes through the slot 74, the capillary tube is looped through a vertical slot 82 in the upper surface of the valve body 11. A retaining plate 83 is clamped to said valve body over the capillary tube by means of a screw 84, to prevent accidental removal of the tube 66 from said slot.

Operation

With the above described valve installed in a fuel supply line to a unit heater, and the space in which the bulb 67 is located being at, or higher than, the desired temperature, the parts of the valve will be in the positions shown in the drawing. That is, both valves are closed and the upper edges of the portions 54 of the lever 51 are spaced from the lower surface of the stop disc 37. Should the temperature in the space in which the bulb 67 is located, usually a room of a house, fall below the control temperature, the liquid in the bulb 67 and bellows 62a will decrease in volume, permitting the lower end of the bellows to move upwardly. The spring 62 will cause the plunger 52 to follow the bellows and thus raise the lever 51. The lever 51 will first pivot about the plunger 50, due to the fact that spring 47 is stronger than spring 25, and also due to the fact that the distance between the pivot 53 and the plunger 50 is greater than the distance between the pivot 53 and the plunger 40, and thus cause upward movement of the plunger 40. As the plunger 40 moves upwardly, it will force the pivot edge 34 on the disc 35 upwardly against the snap-disc until a sufficient force is exerted thereon to cause the snap-disc to snap the pin 28 and the valve 23 to their open positions against the bias of spring 25. The stop disc 37 is preferably adjusted with respect to the snap-disc so as to cause the upper edge of the portion 54 of lever 51 to engage the lower surface thereof immediately after the valve 23 is snapped to its open position. This will immediately stop the upward movement of the plunger 40 and the associated end of the lever 51 and cause further upward movement of the lever 51 to pivot about the lower end of the plunger 40. Then, with the plunger 40 as a pivot, continued upward movement of the bellows and plunger 52, due to continued lowering of temperature around the bulb 67 will cause the plunger 50 to move upwardly and raise the valve 45 off of seat 41. The extent of opening of the valve 45 is dependent upon the extent of temperature drop at bulb 67, the valve 45 moving toward wide open posiiton upon decreasing temperature and toward closed position upon rising temperature. It is thus seen that the amount of gas supplied to the heater is dependent upon the heat load or demand.

As the space or room temperature approaches the desired control temperature, the valve 45 will first close followed by the snap-closing of the valve 23 from its full open, the minimum gas flow position of the valve unit, to provide safe shut-off of the gas.

To change the control temperature of the valve, it is only necessary to rotate the knob 76 in a clockwise direction, as indicated by the arrow on the indicia plate 81, for lower room temperatures and counterclockwise for hotter room temperatures, making use of the pointer 73 for visual indication of the selected control temperature. The arcuate slot 79 in the knob 76 will engage the stop arm 72 at the highest adjustable room temperature to prevent accidental setting of the valve for a temperature that may produce an undesired room temperature and possibly an unsafe operation of the heater. The groove 79 will also engage the stop arm 72 at the lowest room temperature setting and, at that position, will bring the lower end of the bellows plug 63 into engagement with the upper surface of the enlarged head of plug 64, to positively prevent upward movement of the plunger 52 to open either of the valves, regardless of how low the room temperature goes. It is thus seen that this adjustment provides permanent shut-down of the heating unit.

Having described the preferred embodiment of the invention and the operation thereof, it is desired that it be understood that various modifications may be made of the invention without departing from the spirit thereof. Therefore, the scope of the invention should be determined solely from the appended claims.

I claim:

1. A fluid flow control device comprising a valve body having an inlet and an outlet with a partition therebetween, a small opening in said partition having a first valve seat therearound, a first valve biased toward seating engagement with said first valve seat, a large opening in said partition having a second valve seat therearound, a second valve biased toward said second seat, snap-acting means for actuating said first valve, a first plunger for actuating said snap-acting means, an adjustable stop for said first plunger, a second plunger for actuating said second valve, a lever having a first end in engagement with said first plunger and a second end in engagement with said second plunger, a third plunger pivotally connected at one end thereof to said lever nearer said first plunger than said second plunger, means for biasing said third plunger in a direction to open both valves in sequence, and power means for overpowering said biasing means to permit closing of said valves.

2. A fluid flow control device comprising a valve body having an inlet and an outlet with a partition therebetween, a small opening in said partition having a first valve seat therearound, a first valve biased toward seating engagement with said first valve seat, a large opening in said partition having a second valve seat therearound, a second valve biased toward said second seat, snap-acting means for actuating said first valve, a first plunger for actuating said snap-acting means, an adjustable guide and stop for said first plunger, a second plunger for actuating said second valve, a lever having a first end in engagement with said first plunger and a second end in engagement with said second plunger, a third plunger pivotally connected at one end thereof to said lever intermediate its ends, means for biasing said third plunger in a direction to normally open both valves, and power means for overpowering said biasing means to cause closing of said valves.

3. In a fluid flow controller, the combination comprising a valve body having an inlet and an outlet with a separating wall therebetween, a first and second opening through said wall, first and second valve seats around said openings, first and second valves, first and second biasing means urging said valves toward their respective valve seats, a pin extending through said first opening into engagement with said first valve, a washer-shaped snap-disc having an inwardly extending tongue, an aperture in said snap-disc in alignment with said tongue, the free end of said tongue engaging said pin for operating the same, means for engaging said snap-disc intermediate its inner and outer circumferential edges for snapping said tongue and first valve to their valve-open positions, means for engaging said second valve to open the same after the first valve has been opened and condition responsive power means having a floating lever for actuating both of said means engaging said valves and so related to said valves as to sequentially open said valves in one direction of movement of said condition responsive power means and to sequentially permit the closing of said valves in the other direction of movement thereof.

4. A fluid flow control device comprising a valve body having an inlet and an outlet with a partition therebetween, a small opening in said partition having a first valve seat therearound, a first valve biased toward seating engagement with said first valve seat, a large opening in said partition having a second valve seat therearound, a second valve biased toward said second seat, snap-acting means for actuating said first valve, a first means for actuating said snap-acting means, an adjustable stop for said first means, a second means for actuating said second valve, a lever having a first end in engagement with said first means and a second end in engagement with said second means, a plunger pivotally connected at one end thereof to said lever intermediate its ends, means for biasing said plunger in a direction to normally open both valves, and power means for overpowering said biasing means to permit closing of said valves, said stop operating to stop valve opening movement of said first means after said first valve has opened, to cause opening of said second valve by continued movement of said plunger.

5. A fluid flow control device comprising a valve body having an inlet and an outlet with a partition therebetween, a small opening in said partition having a first valve seat therearound, a first valve biased toward seating engagement with said first valve seat, a large opening in said partition having a second valve seat therearound, a second valve biased toward said second seat, snap-acting means for actuating said first valve, a first means for actuating said snap-acting means, an adjustable guide and stop for said first means, a second means for actuating said second valve, a lever having a first end in engagement with said first means and a second end in engagement with said second means, a third means pivotally connected at one end thereof to said lever nearer said first means than said second means, means for biasing said third means in a direction to normally open both valves, and power means for overpowering said biasing means to permit closing of said valves.

6. In a fluid flow controller, the combination comprising a valve body having an inlet and an outlet with a separating wall therebetween, a first and second opening through said wall, first and second valve seats around said openings, first and second valves, first and second biasing means urging said valves toward their respective valve seats, a first pin extending through said first opening into engagement with said first valve, a washer-shaped snap-disc having an inwardly extending tongue with fillets at the base of said tongue, an aperture in said snap-disc near said tongue and in alignment therewith to compensate for the stiffening effect of the fillets on said disc, the free end of said tongue engaging said pin for operating the same, means for engaging said snap-disc intermediate its inner and outer circumferential edges for snapping said tongue and pin and first valve to their valve-open positions, a second pin for engaging said second valve to open the same, and condition responsive power means having a floating lever arranged for actuating both of the valve operating means to sequentially open both of said valves in one direction of movement of said condition responsive power means.

7. In a fluid flow controller, the combination comprising a valve body having an inlet and an outlet with a separating wall therebetween, a first and second opening through said wall, first and second valve seats around said openings, first and second valves, first and second biasing means urging said valves toward their respective valve seats, and condition responsive power means having a floating lever for sequentially actuating said first and second valves in one direction of its movement and to sequentially release said first and second valves in the other direction of its movement to cause the opening and to permit the closing of said valves, said lever engaging said valves at opposite ends of the lever and being connected to said power means at a point closer to said first valve than said second valve.

8. In a fluid flow control device, the combination comprising a valve body having an inlet and an outlet with a separating wall therebetween, a first and second opening through said wall, first and second valve seats around said openings, a first snap-acting valve, a second larger valve, first and second biasing means urging said valves toward their respective valve seats, and condition responsive power means having a floating lever connected thereto at unequal distances from the ends of said lever for actuating said valves sequentially to their open positions during the movement of said condition responsive power means in one direction.

References Cited in the file of this patent

UNITED STATES PATENTS

| | | |
|---|---|---|
| 2,040,762 | Spencer | May 12, 1936 |
| 2,177,544 | Warner | Oct. 24, 1939 |
| 2,314,842 | Hedeman et al. | Mar. 24, 1943 |
| 2,341,858 | Dubilier | Feb. 15, 1944 |
| 2,513,804 | Kaminsky | July 4, 1950 |
| 2,590,674 | Bodey | Mar. 25, 1952 |